May 11, 1954
A. SCHECTER
2,677,892
MEASURING GAUGE FOR WRIST WATCH CASE, STRAP, BRACELET, AND THE LIKE
Filed Feb. 17, 1953
2 Sheets-Sheet 1
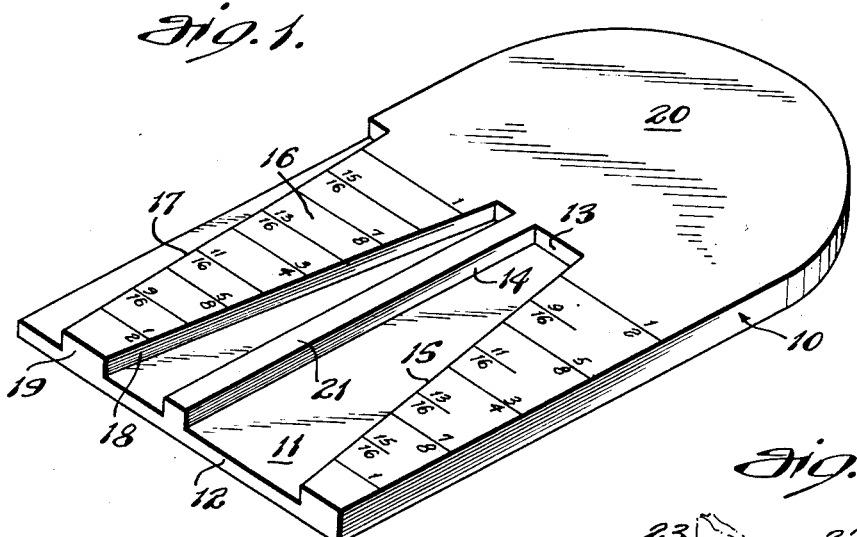
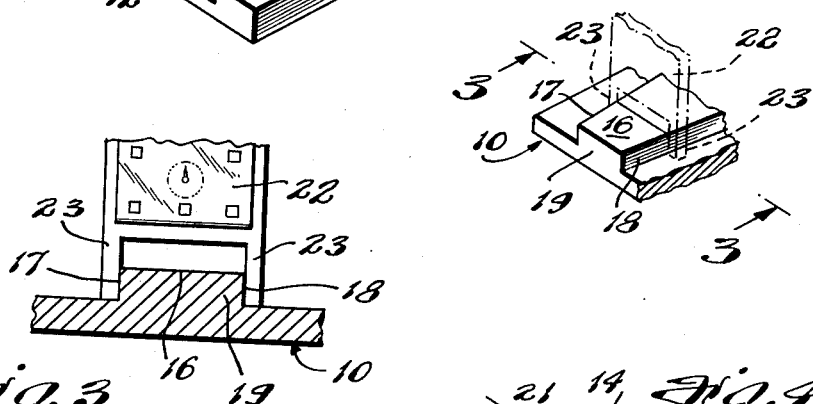
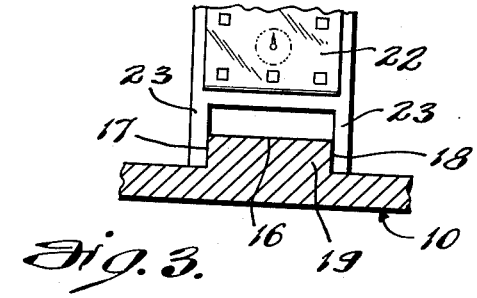
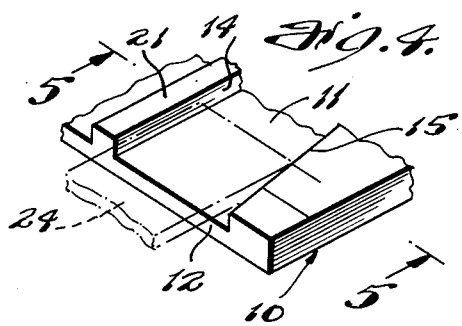
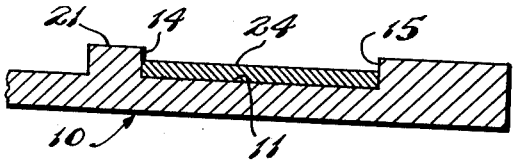
INVENTOR.
ARTHUR SCHECTER
BY
Lester Dittenhofer
ATTORNEY

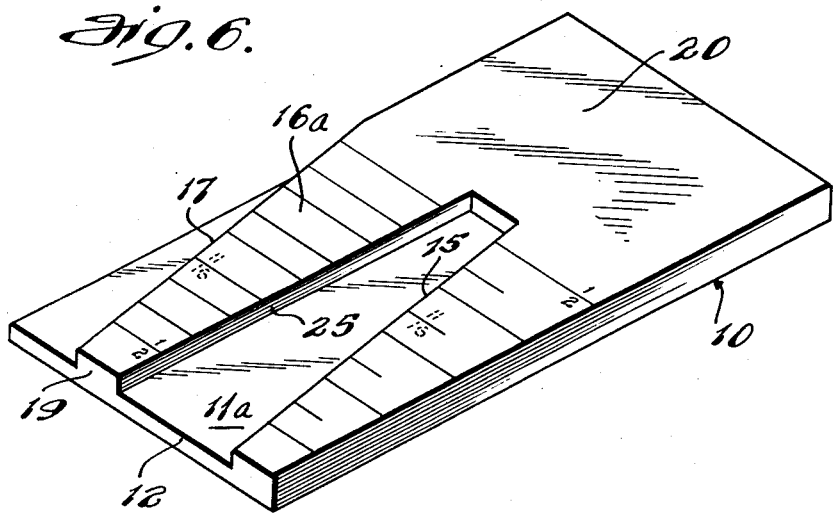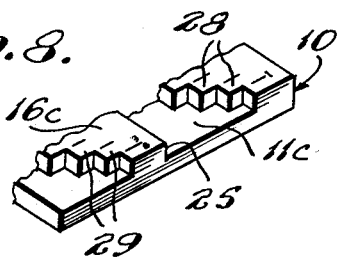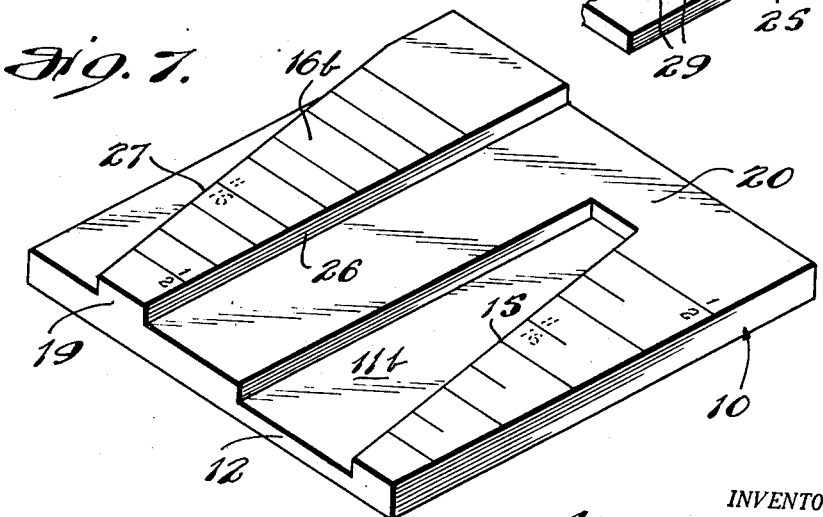

Patented May 11, 1954

2,677,892

UNITED STATES PATENT OFFICE 2,677,892

MEASURING GAUGE FOR WRIST WATCH CASE, STRAP, BRACELET, AND THE LIKE

Arthur Schecter, New York, N. Y., assignor of one-half to Samuel Neiman, New York, N. Y.

Application February 17, 1953, Serial No. 337,331

2 Claims. (Cl. 33—168)

This invention relates to a measuring device for fitting a band such as a strap, bracelet, and the like to a wristwatch.

Difficulty is often experienced by jewelers and others in selecting a band of correct width to fit a particular wristwatch. This is especially true as the spacing of the lugs or ears of the cases of such watches, into which space the band is to be fitted may vary considerably in width from that of the small ladies watch to the large man's watch. The conventional range is from about ⅜" or ½" to about 1".

The band is commonly fitted empirically, that is, by observation or trial and error. This frequently necessitates trying several bands before one of the correct width is found, with consequent annoyance and loss of time. In some instances, attempts are made to measure the spacing with a ruler or other straight edge, but this has not proven to be entirely successful.

Having these difficulties in mind, it is an object of my invention to provide a measuring device for properly and expeditiously fitting a band of correct width to a wristwatch case of any conventional size.

Another object is to provide a device that will accurately and automatically determine the proper width of band to be used with any particular wristwatch case.

A further object is to provide a device that is easy to operate.

A still further object is to provide a device of simple construction that is economical to manufacture.

Other objects and advantages of the invention will appear from the following description thereof, reference being had to the accompanying drawings, in which:

Figure 1 is a perspective view of a preferred embodiment of the device;

Fig. 2 is a fragmentary perspective view showing the device as used for measuring the spacing between the lugs of a wristwatch case, the case being indicated in dot-and-dash lines;

Fig. 3 is a fragmentary vertical sectional view on the line 3—3 of Fig. 2 with the representation of a watch shown in full lines and partly broken away;

Fig. 4 is a fragmentary perspective view showing the device as used for measuring the width of a wristwatch band or strap;

Fig. 5 is a fragmentary vertical sectional view taken on the line 5—5 of Fig. 4;

Figs. 6 and 7 are perspective views of modified forms of the device; and,

Fig. 8 is a fragmentary view of another modified form.

The device comprises a board or body 10 of any suitable size and shape having a flat base so that it may rest steadily upon a counter, table, or other flat surface. The board may be made of plastic, wood, fiber-board, papier-mache, cardboard, or other suitable material. For ease and economy in mass production, it is preferred to manufacture the device of suitable plastic material by a molding operation.

Depressed or sunken in the board 10 is a groove or indentation 11 that is open at its outer end 12, and that gradually decreases in width, in terms of fractions of an inch, from its open outer end to its inner closed end 13. The groove is preferably about ⅛" in depth and is defined by a straight wall 14 and an inclined wall 15.

The board is further provided with a tapered ridge 16 having similarly inclined walls 17 and 18. The ridge widens by degrees of fractions of an inch from its outer end 19 toward its inner or upper end. The height of the ridge, measured upward from the plane of the bottom of the groove, is preferably the same as the depth of the groove, namely about ⅛". Accordingly, the upper face of the ridge will be flush with the upper edges of the walls of the groove to provide a flat surface across the board, which surface may be a continuation of the flat surface 20 of the upper portion of the board above the groove and ridge.

Both the groove and the ridge are calibrated, as shown in Fig. 1, to indicate the widths of these elements at the various points marked, according to the graduations.

A rib 21 intervenes the groove 11 and ridge 16, sufficient space being left between the wall of the rib and the opposed wall 18 of the ridge to permit of passage of a lug or ear of a watchcase. The rib further serves, for the sake of strength and economy of material, to reinforce the board and allows it to be made quite thin, preferably about 3/32", between its base and the bottom of the groove, as at 12.

The wristwatch case, indicated by the reference number 22, has conventional pairs of lugs or ears 23, at its top and bottom ends, between which the ends of the watchband 24 are fitted and secured with pins. In the drawings only one end of the watchcase is shown.

In use of the device, an end of the wristwatch case is placed on the lower end portion of the ridge or projection 16 with a pair of lugs 23 straddling it, and the case is then drawn or moved inward or upward as far as it will go. The graduation mark at the stopping point will then accurately indicate the measure of width of the space between said pair of lugs.

The width of the band 24 to be fitted to the case is determined by inserting an end of the band into the groove 11 and pushing it inwardly or upwardly until it reaches a stopping point. One vertical or upright wall of the groove, as the wall 14, is preferably straight. Since the sides of a wristwatch band are usually straight, the straight wall will serve to guide the band properly, without allowing it to tilt or move out of line as it is pushed inward. This is important because any deviation from straight-line movement of the band might result in error in measuring its width.

In the modified form of device, shown in Fig. 6, the rib 22 is eliminated, and the groove 11a and ridge 16a have a common vertical or upright wall 25, which in this instance is a straight wall.

The modified form illustrated in Fig. 7 has a groove 11b, similar to the groove 11, but in this case the ridge 16b is raised above the level of the upper surface of the board 10. In this form the ridge has one straight wall 26 and one inclined wall 27. This form of board is not as economical of material as those previously described but lends itself to ease of manufacture in a case where the ridge may be made of a separate part and attached or fixed to the board.

As shown in Fig. 7 it will be evident that it is not essential that the walls of the groove and of the ridge be smooth and unbroken because one wall, or even both, may be of stepped formation. For example, in this figure the wall 28 of the groove 11c, and the wall 29 of the ridge 16c, are each stepped at uniformly spaced intervals, the successive steps differing in degree from each other in terms of fractions of an inch. The horizontal edges of the several steps provide stopping points for determining the width of the space between a pair of lugs, or the width of the band, as the case may be. The widths at the steps may be indicated by appropriate graduated marks.

The device is suitable for use as an advertising article to be distributed to jewelers and others, and to that end the board should have enough clear surface to be marked with the name, other identification, and advertising matter of the distributor.

Various other modifications in the shape, arrangement of parts, and details of the device may be made within the scope of the invention, as described and claimed.

The term "band" is used in the claims to include a strap, bracelet, expansible band, or other flexible strip of any material used to hold a watch in place by encircling the wrist of the wearer.

While in the claims and the specification the calibration of the ridge and groove is defined according to the United States linear measure "in terms of fractions of an inch," it is to be understood that calibration in terms of the metric or other recognized linear measure is to be deemed the equivalent thereof.

What I claim is:

1. A gauge for use in fitting a band to a wristwatch case having pairs of lugs between which the ends of the band are to be fitted, comprising a board having a ridge for measuring the width of the space between a pair of lugs of the watch case and a groove for measuring the width of a band, said ridge and groove each being tapered in form to vary in width in degrees of fractions of an inch, and being calibrated to indicate the width at various points along the length of each, one wall of said ridge being substantially parallel to the adjacent wall of said groove, and said ridge and groove extending in reverse direction with the widest end of the groove opening at one edge of the board.

2. A gauge for fitting a band to a wristwatch case as specified in claim 1 wherein the parallel walls of the ridge and the groove are coextensive.

References Cited in the file of this patent

UNITED STATES PATENTS

| Number | Name | Date |
| --- | --- | --- |
| 527,581 | Benson | Oct. 16, 1894 |
| 885,838 | Coats | Apr. 28, 1908 |
| 1,315,716 | Forester | Sept. 9, 1919 |

FOREIGN PATENTS

| Number | Country | Date |
| --- | --- | --- |
| 355,062 | Germany | June 20, 1922 |
| 17,249 | Great Britain | 1895 |